March 27, 1951  G. R. BYBEE  2,546,495
HOOD REFLECTION VISOR
Filed May 5, 1950
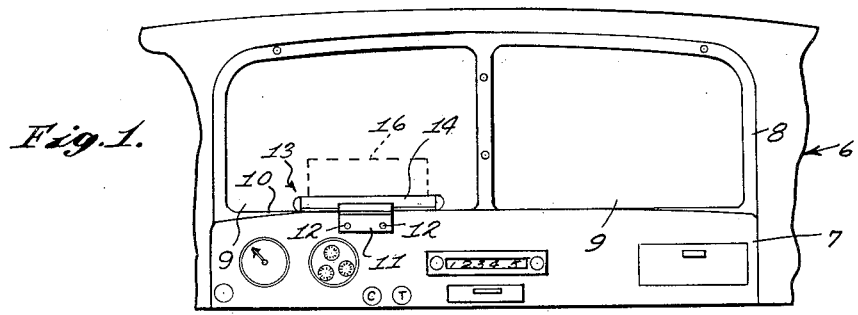
Fig. 1.
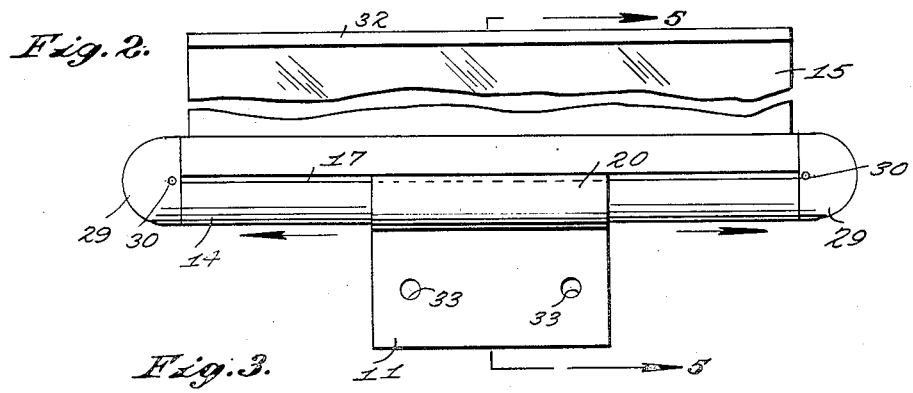
Fig. 2.
Fig. 3.
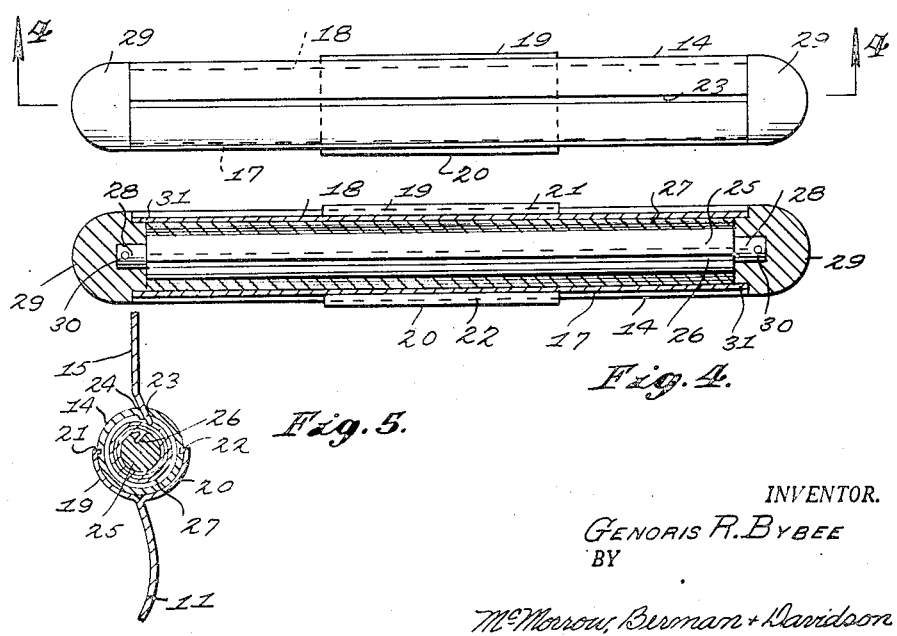
Fig. 4.
Fig. 5.
INVENTOR.
GENORIS R. BYBEE
BY
McMorrow, Berman + Davidson
ATTORNEYS Patented Mar. 27, 1951

2,546,495

UNITED STATES PATENT OFFICE 2,546,495

HOOD REFLECTION VISOR

Genoris R. Bybee, Boise, Idaho

Application May 5, 1950, Serial No. 160,148

2 Claims. (Cl. 296—97)

This invention relates to shields and vizors for automobiles, and particularly to a hood reflection vizor.

An object of this invention is to provide an automobile with a vizor which serves as a shield to cut off the glare and reflection of the sun and lights glancing off the hood of the car which tend to interfere with free and clear vision of the road.

Another object of the invention is to provide a reflection vizor of the indicated character upon the cowling or lower portion on the windshield on the car in front of the driver in such position as to cut off hood reflection without in any way reducing or impairing the necessary range of view which must be available to the driver.

A further object is to provide such a reflection vizor which is shiftable from side to side and adjustable in height to suit varying conditions.

A still further object is to have such a vizor upon an automobile which is unobtrusive and in keeping with the high standards of appearance of the instruments and appurtenances of the car, and both instantly accessible and convenient to use at will.

A still further object of this invention is to make a vizor of this type which is simple to manufacture and use and low in cost in order to encourage wide distribution thereof.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a fragmentary elevation of a portion of an automobile looking forward from the driver's seat, showing the hood reflection vizor in operative position and accessible to the driver of a car;

Figure 2 is an enlarged elevation of the same hood reflection vizor;

Figure 3 is a plan view of the same vizor as seen from the top in Figure 2;

Figure 4 is a longitudinal section taken on line 4—4 in Figure 3;

Figure 5 is a vertical section taken on line 5—5 in Figure 2.

In the views the same reference numerals indicate the same or like parts.

Among the several hazards faced by the driver of an automobile or truck, one stands out as inexcusable but seriously annoying and actually looms as a menace, namely, the reflection of the sun or strong lights upon the hood and radiator top of the car when driving toward the sun or said lights. The bright glare or reflection from the hood is often so strong as to interfere with a proper view of the road and is altogether independent of the glare of the headlights of oncoming automobiles along the road at nighttime, being thus mainly a daylight hazard becoming acute in the late afternoon when the sun is low.

Upon considering this problem, it has occurred to me that some means should be conveniently available for stopping such wholly unnecessary glare and reflection off the hood of the car, and as a result I have found it quite feasible to produce a special hood reflection vizor which is adapted to be attached to the automobile in accessible position to the driver, as will now be set forth in full.

Hence, in the practice of my invention, and referring again to the drawing, an automobile partly indicated at 6 has a dashboard or instrument board 7 above which is mounted a windshield frame 8 containing two windshield glass lights, 9, 9, the upper part of the instrument board 7 meeting or merging with the cowling 10 of the car and scarcely appearing in Figure 1. Upon the upper portion of the instrument board or cowling, and certainly below the windshield is mounted a bracket 11 by means of a pair of screws 12 of a vizor generally indicated at 13 having a split tube 14 from which may be upwardly extended an opaque flexible curtain 15, as indicated in broken lines at 16 in Figure 1. The elongated split tube 14 is provided upon the near side and the far side as well with a pair of grooves 17, 18 which extend the entire length of the tube. The bracket 11 is provided at the upper end thereof with a clamping yoke having two arcuate clamping portions 19, 20, as best seen in Figure 5, terminating at the upper edges in a pair of inwardly-extending opposite flanges 21, 22 which normally extend slidably into the grooves 17, 18 of the split tube 14. The latter has a longitudinal opening 23 along the upper portion thereof, one of the edges 24 being bent inwardly and rounded to reduce friction and facilitate the extension of curtain 15 therefrom or withdrawal into the sleeve or tube 14 without damage to the curtain. Within the sleeve is located a roller 25 having a groove 26 into which the inner end of curtain 15 introduced and secured, the curtain normally being rolled at 27 about roller 25 and extending varying distances up from tube 14 as adjusted by the driver.

In order to provide means for adjusting the curtain or vizor shield 15, the roller 25 is provided at both ends with a pair of studs 28, 28 extending into a pair of end knobs 29, 29 and secured thereto by means of a pair of pins 30, 30, so that rotation of either knob by hand will cause roller 25 to rotate therewith. The inner ends of knobs 29 are provided with recessed cylindrical shoulders 31, 31 fitting rotatably within the ends of split tube 14 so that roller 25 and the knobs will thus be centered and rotate while the tube 14 remains fixed, the upper flanges 21, 22 of the clamping portions 19 and 20 on bracket 11 serving to prevent rotation of tube 14 with the knobs 29 and roller 25. If desired, the upper end of the curtain or flexible vizor shield 15 may be finished with reinforcing edge material, such as a metal band or fabric strip 32, shown in Figure 2, or such reinforcement may be omitted altogether, and the upper end of curtain 15 may simply be trimmed to suit. If either knob 29 is rotated counter-clockwise, as viewed in Figure 5, the roller 25 will cause the turns 27 of curtain shield 15 to rise up through opening 23 while riding on the rounded edge 24, whereas if the knobs are turned to rotate roller 25 clockwise in Figure 5, curtain 15 will be withdrawn into tube 14 and rolled up on roller 25. The curtain shield 15 is preferably made of at least slightly flexible material which is sufficiently stiff, however, to remain upright when extended upwardly through the opening or slot 23 in tube 14, such material being preferably a flexible or semi-flexible plastic, such as one of the cellulose base plastics or Vinylite, or any other material that will serve the purpose, the curtain being necessarily opaque or very nearly so, so that bright light will not be transmitted therethrough.

Bracket 11 has been illustrated virtually as a curved plate which is drawn flat when screws 12, 12 are inserted into holes 33, 33 thereof, but it may be made flat and of rigid sheet metal or even of a doubled sheet metal, if desired.

Aside from the vertical adjustment of the curtain 15 which is possible by manipulation of either knob 29, the tube as a whole is slidably held by clamping portions 19 and 20 of bracket 11 in such fashion that this tube 14 may be slid either to the right or to the left in order to shift the curtain when extended upwardly, to cover any area of reflection occurring from the hood of the car, the projecting flanges 21 and 22 of the clamping portions slidably fitting into grooves 17 and 18 allowing such shift and longitudinal adjustment of the tube with its roller and curtain.

When the curtain is fully withdrawn into the tube, it will, of course, be entirely unobtrusive and such position of the curtain will serve during a large part of the day, but when the sun begins to incline toward the horizon in the afternoon and evening, and the car is driven toward the sun, a partial or full turn of the knobs 29 will raise curtain 15 just sufficiently to cut off the glare or reflection from the hood and radiator of the car without subtracting any portion of the proper view of the road, and as the adjustment is also possible laterally of the shield as a whole, it will serve to completely block all annoying reflections and glare from the forward parts of the car.

The roller 25 and the knobs 29 may obviously be made of any material suitable for the purpose, such materials as wood or plastic being suggested, or even light metal may be used. The split tube, as well as the bracket 11 with its clamping portions may also be made of plastic, but metal will serve quite well in this respect and can be readily finished to suit the general appearance of the instruments of the car.

Manifestly, variations may be resorted to and parts and features may be modified or used without others within the scope of the appended claims.

Having now fully described my invention, I claim:

1. A hood reflection vizor for an automobile including a bracket adapted for attachment to the latter adjacent to the windshield thereof, the bracket having a pair of upwardly-extending arcuate clamping portions integral therewith forming a yoke, a pair of opposite inwardly-extending flanges upon the upper edges of the clamping portions, an elongated tubular member having a longitudinal slot in the upper portion thereof extending from end to end and a pair of opposite longitudinal grooves upon the front and rear sides thereof in which the flanges upon the clamping portions engage slidably to allow longitudinal shifting or adjustment of the tubular member with respect to the bracket, a roller rotatably located within said tubular member, means upon the ends of the roller exposed upon the ends of said tubular member for manually rotating said roller including a pair of studs on the ends of the roller, knobs fixed on the studs and having inwardly-directed reduced portions extending rotatably into the ends of said tubular member, and a flexible curtain of sheet material at least partly wound upon and attached to the roller with the outer end thereof normally projecting upwardly through the longitudinal slot in said tubular member and being extensible to variable extents upwardly therefrom.

2. A hood reflection vizor for an automobile including a plate forming a bracket adapted to be attached to a portion of the latter adjacent to the windshield thereof, the plate having a pair of upwardly-extending arcuate integral clamping portions forming a yoke, a pair of opposite inwardly-extending horizontal flanges upon the upper edges of the clamping portions, an elongated tubular member having a longitudinal slot in the upper portion thereof with one edge along said slot being turned inwardly and rounded, said tubular member having a pair of opposite longitudinal grooves upon the front and rear sides thereof in which the flanges upon the clamping portions engage slidably to allow longitudinal shifting or adjustment of the tubular member with respect to the bracket, a roller rotatable within said tubular member, means including a pair of hemispherical knobs exposed upon the ends of said tubular member for manually rotating said roller, a pair of studs on the ends of the roller supporting said knobs and rigidly secured thereto, a pair of inwardly directed reduced portions upon the inner ends of said knobs extending rotatably into the ends of said tubular member and abutting the ends of the roller, and a flexible curtain of sheet material at least partly wound upon and attached to the roller with the outer end thereof normally projecting through the longitudinal slot in said tubular member and upwardly extensible to variable extent therefrom.

GENORIS R. BYBEE.

REFERENCES CITED

The following references are of record in the file of this patent:

UNITED STATES PATENTS

| Number | Name | Date |
| --- | --- | --- |
| 1,932,475 | Peteler | Oct. 31, 1933 |
| 2,187,027 | Harvey | Jan. 16, 1940 |
| 2,524,173 | Peterson | Oct. 3, 1950 |